(12) United States Patent  
Chen et al.

(10) Patent No.: US 7,305,424 B2
(45) Date of Patent: Dec. 4, 2007

(54) MANIPULATION OF ZOMBIE FILES AND EVIL-TWIN FILES

(75) Inventors: Raymond C. Chen, Campbell, CA (US); John Edwards, Sunnyvale, CA (US); Kayuri Patel, Cupertino, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 804 days.

(21) Appl. No.: 09/932,579

(22) Filed: Aug. 17, 2001

(65) Prior Publication Data

US 2002/0083081 A1    Jun. 27, 2002

Related U.S. Application Data

(63) Continuation-in-part of application No. 09/642,066, filed on Aug. 18, 2000.

(51) Int. Cl.
*G06F 17/30* (2006.01)

(52) U.S. Cl. .................... 707/205; 707/1; 711/161; 714/769

(58) Field of Classification Search .................. 707/3, 707/10, 102, 104.1, 200–205, 1; 711/1, 4, 711/105, 161–162; 714/769, 770
See application file for complete search history.

(56) References Cited

U.S. PATENT DOCUMENTS

| | | |
|---|---|---|
| 4,888,681 A | 12/1989 | Barnes et al. |
| 4,937,763 A | 6/1990 | Mott |
| 5,067,099 A | 11/1991 | McCown et al. |
| 5,088,031 A | 2/1992 | Takasaki et al. |
| 5,155,835 A | 10/1992 | Belsan |
| 5,193,184 A | 3/1993 | Belsan et al. |

(Continued)

FOREIGN PATENT DOCUMENTS

DE    694 25 658 T2    4/2001

(Continued)

OTHER PUBLICATIONS

Hitz et al. File System Design for an NFS File Server Appliance, pp. 1-23.*

(Continued)

*Primary Examiner*—Jean M. Corrielus
(74) *Attorney, Agent, or Firm*—Blakely Sokoloff Taylor & Zafman LLP

(57) ABSTRACT

File system is capable of performing long operations, such as deletions and truncations of long files, in a deterministic and atomic manner with regard to its recorded consistency points. The system includes both live filespace accessible to users, and user-inaccessible zombie filespace. In representative embodiments, the system includes a file deletion manager and a truncation manager capable of operating on files in the zombie filespace. Changes to the zombie filespace can be recorded in persistent memory. After a power failure or a similar event, the system can use the recorded changes to replay operations on the files in the zombie filespace, facilitating recovery. Zombie space can be sized dynamically, enabling the deletion manager to request enlargement of the zombie filespace. In some embodiments, files are transferred to the zombie filespace before links to the files' blocks in the live filespace are broken, and before performing operations on the files.

32 Claims, 5 Drawing Sheets

U.S. PATENT DOCUMENTS

| | | | |
|---|---|---|---|
| 5,317,728 A | 5/1994 | Tevis et al. | |
| 5,403,639 A | 4/1995 | Belsan et al. | |
| 5,535,375 A | 7/1996 | Eshel et al. | |
| 5,557,747 A | 9/1996 | Rogers et al. | |
| 5,564,037 A * | 10/1996 | Lam | 711/161 |
| 5,604,900 A * | 2/1997 | Iwamoto et al. | 707/205 |
| 5,617,568 A | 4/1997 | Ault et al. | |
| 5,638,509 A | 6/1997 | Dunphy et al. | |
| 5,832,522 A | 11/1998 | Blickenstaff et al. | |
| 5,897,638 A | 4/1999 | Lasser et al. | |
| 5,946,685 A | 8/1999 | Cramer et al. | |
| 5,963,962 A | 10/1999 | Hitz et al. | |
| 5,991,753 A | 11/1999 | Wilde | |
| 5,996,054 A | 11/1999 | Ledain et al. | |
| 6,026,402 A | 2/2000 | Vossen et al. | |
| 6,032,227 A | 2/2000 | Shaheen et al. | |
| 6,041,334 A * | 3/2000 | Cannon | 707/204 |
| 6,101,508 A | 8/2000 | Wolff | |
| 6,105,038 A | 8/2000 | Douceur et al. | |
| 6,112,211 A | 8/2000 | Bradshaw et al. | |
| 6,173,293 B1 | 1/2001 | Chandramohan et al. | |
| 6,247,024 B1 | 6/2001 | Kincaid | |
| 6,249,792 B1 | 6/2001 | Zwilling et al. | |
| 6,269,431 B1 * | 7/2001 | Dunham | 711/162 |
| 6,289,356 B1 | 9/2001 | Hitz et al. | |
| 6,301,677 B1 * | 10/2001 | Squibb | 714/13 |
| 6,317,844 B1 * | 11/2001 | Kleiman | 714/6 |
| 6,321,219 B1 * | 11/2001 | Gainer et al. | 707/3 |
| 6,334,114 B1 * | 12/2001 | Jacobs et al. | 705/26 |
| 6,353,878 B1 | 3/2002 | Dunham | |
| 6,366,988 B1 | 4/2002 | Skiba et al. | |
| 6,446,091 B1 * | 9/2002 | Noren et al. | 707/202 |
| 6,529,921 B1 | 3/2003 | Berkowitz et al. | |
| 6,560,615 B1 * | 5/2003 | Zayas et al. | 707/202 |
| 6,594,744 B1 * | 7/2003 | Humlicek et al. | 711/162 |
| 6,615,224 B1 * | 9/2003 | Davis | 707/202 |
| 6,636,879 B1 * | 10/2003 | Doucette et al. | 707/205 |
| 6,684,225 B1 * | 1/2004 | Huras et al. | 707/202 |
| 6,697,795 B2 * | 2/2004 | Holcomb | 707/2 |
| 6,728,922 B1 * | 4/2004 | Sundaram et al. | 714/769 |
| 6,751,635 B1 * | 6/2004 | Chen et al. | 707/200 |
| 6,757,695 B1 * | 6/2004 | Noveck et al. | 707/200 |
| 6,877,018 B2 | 4/2005 | Oshins et al. | |
| 6,910,154 B1 * | 6/2005 | Schoenthal | 714/18 |
| 6,952,797 B1 * | 10/2005 | Kahn et al. | 714/770 |
| 7,003,714 B1 * | 2/2006 | Sundaram et al. | 714/769 |
| 7,043,503 B2 | 5/2006 | Haskin et al. | |
| 7,051,050 B2 * | 5/2006 | Chen et al. | 707/200 |
| 7,072,916 B1 * | 7/2006 | Lewis et al. | 707/205 |
| 7,076,509 B1 | 7/2006 | Chen et al. | |
| 2002/0083037 A1 * | 6/2002 | Lewis et al. | 707/1 |
| 2002/0083081 A1 * | 6/2002 | Chen et al. | 707/200 |
| 2002/0089508 A1 | 7/2002 | Sowizral et al. | |
| 2003/0167287 A1 * | 9/2003 | Forster | 707/203 |
| 2004/0139273 A1 * | 7/2004 | Doucette et al. | 711/100 |
| 2005/0033775 A1 | 2/2005 | Chen et al. | |
| 2005/0246503 A1 | 11/2005 | Fair | |

FOREIGN PATENT DOCUMENTS

| | | |
|---|---|---|
| EP | 0 474 395 A2 | 3/1992 |
| EP | 0537098 | 4/1993 |
| EP | 0 702 815 B1 | 8/2000 |
| WO | WO94/29807 A1 | 12/1994 |
| WO | 00/11553 | 3/2000 |
| WO | WO 02/19110 A2 | 3/2002 |

OTHER PUBLICATIONS

Hitz et al., File System Design for an NFS File Server Appliance, pp. 1-23, Jan. 1992.*

Hitz et al., "File System Design for an NFS File Server Appliance" Proceeding of the USENIX Winter 1994, Technical Conference, Jan. 19, 1994.*

Jacques Cohen. "Garbage Collection of Linked Data Structures". Dept. of Physics, Brandeis University, Waltham, Ma. 1981 ACM. Computing Surveys. vol. 13. No. 3. Sep. 1981.

Henry Lieberman. "A Real-Time Garbage Collector Based on the Lifetimes of Objects". Communications of the ACM. Jun. 1983 vol. 26 No. 6.

Mulqueen, John T. "Product Analysis Review". Communications Week. v. 452, p. 25(1), May 3, 1993.

Slashdot. Tux2: "The Filesystem That Would Be King", Oct. 17, 2000.

Hutchinson, Norman et al. "Logical vs. Physical File System Backup." Third Symposium on Operating Systems Design and Implementation, Feb. 22-25, 1999, pp. 239-249, New Orleans, LA, USA.

Gray, Jim and Andreas Reuter. "Transaction Processing: Concepts and Techniques." 1993, pp. 724-732, Morgan Kaufmann, San Francisco.

Chung et al. "Checkpointing in CosMiC: a User-level Process Migration Environment," IEEE, 1997, pp. 187-193.

Elnohazy et al. "A Survey of Rollback-Recovery Protocols in Message-Passing Systems." ACM Computing Surveys, Sep. 2002, pp. 375-408, vol. 34, No. 3.

Ott et al. "SRED: Stabilized RED." Proceedings of INFOCOM, 1999, pp. 1-10, Bellcore and Bell Laboratory.

Rodriguez et al. "A New Checkpoint Mechanism for Real Time Operating Systems." ACM SIGOPS Operating Systems Review, Oct. 1997, pp. 55-62, vol. 31, iss. 4, ACM Press, New York, NY.

Bozas, International Search Report of PCT/US01/2590, European Patent Office, Jul. 10, 2002.

Kespret, PKZIP LHARC & Co: Using Data Compression Utilities, 1995, Abacus.

Koers, "Microsoft Windows XP fast & easy," 2002, Premier Press, pp. 130-134.

Levy et al., "Distributed File Systems: Concepts and Examples," Dec. 1990, ACM Computing Surveys, vol. 22, No. 4.

Netlingo.com, Definition of "Zombie", retrieved Nov. 2006.

Silberschatz et al., "Operating System Concepts," 2002, John Wiley & Sons, Sixth Ed.

Symantic, "The Norton Desktop: The Essential Set of windows Utilities & Productivity Tools," 1993, Version 3 for Windows.

Xreferplus.com, Definition of "zombie", retrieved Nov. 2006.

Chia Chao et al., "Mime: A High Performance Storage Device With Strong Recovery Guarantees", Concurrent Systems Project, HP Laboratories, Mar. 18, 1992.

David Hitz, "Technical Report TR01: An NFS File Server Appliance", Rev. A Aug. 1993, Network Appliance Corporation, Santa Clara, CA.

David Simpson,"'Appliances' Take Over File Server Role", Digital News and Review, vol. 11, No. 6, pp. 1-2, Mar. 21, 1994.

John Ousterhout & Fred Doublis, "Beating the I/O Bottleneck: A Case for Log-Structured File Systems". Electrical Engineering and Computer Sciences, UC Berkeley, CA, Oct. 1998.

Kleiman et al.; Using NUMA Interconnects For Highly Available Filers; IEEE Micro. 1999; pp. 42-48. XP002164052.

Network Appliance. Data ONTAP Event Management System, Aug. 10, 2000.

* cited by examiner

MANIPULATION OF ZOMBIE FILES AND EVIL-TWIN FILES

CROSS-REFERENCE TO RELATED APPLICATION

This application is a continuation-in-part of U.S. patent aplication Ser. No. 09/642,066, Express Mail Mailing No. EL 524 780 256 US, filed Aug. 18, 2000, in the name of the same inventors, titled "Manipulation of Zombie Files and Evil-Twin Files".

BACKGROUND OF THE INVENTION

1. Field of the Invention

This invention relates to file server systems, including those file server systems in which it is desired to maintain reliable file system consistency.

2. Related Art

In systems providing file services, such as those including file servers and similar devices, it is generally desirable for the server to provide a file system that is reliable despite the possibility of error. For example, it is desirable to provide a file system that is reliably in a consistent state, regardless of problems that might have occurred with the file server, and regardless of the nature of the file system operations requested by client devices.

One known method of providing reliability in systems that maintain state (including such state as the state of a file system or other set of data structures) is to provide for recording checkpoints at which the system is known to be in a consistent state. Such checkpoints, sometimes called "consistency points," each provide a state to which the system can retreat in the event that an error occurs. From the most recent consistency point, the system can reattempt each operation to reach a state it was in before the error.

One problem with this known method is that some operations can require substantial amounts of time in comparison with the time between consistency points. For example, in the WAFL file system (as further described in the Incorporated Disclosures), operations on very large files can require copying or modifying very large numbers of file blocks in memory or on disk, and can therefore take a substantial fraction of the time from one consistency point to another. In the WAFL file system, two such operations are deleting very large files and truncating very large files. Accordingly, it might occur that recording a consistency point cannot occur properly while one of these extra-long operations is in progress.

The fundamental requirement of a reliable file system is that the state of the file system recorded on non-volatile storage must reflect only completed file system operations. In the case of a file system like WAFL that issues checkpoints, every file system operation must be complete between two checkpoints. In the earliest versions of the WAFL file system there was no file deletion manager present, thus very large files created a problem as it was possible that such large files could not be deleted between the execution of two consistency checkpoints.

This problem was partially solved in later versions of the WAFL file system, where a file deletion manager was assigned to perform the operation of file deletion, and a consistency point manager was assigned to perform the operation of recording a consistency point. The file deletion manager would attempt to resolve the problem of extra-long file deletions by repeatedly requesting more time from the consistency point manager, thus "putting off" the consistency point manager until a last-possible moment. However, at that last-possible moment, the file deletion manager would be required to give way to the consistency point manager, and allow the consistency point manger to record the consistency point. When this occurred, the file deletion manager would be unable to complete the file deletion operation. In that earlier version of the WAFL file system, instead of completing the file deletion operation, the file deletion manager would move the file to a fixed-length "zombie file" list to complete the file deletion operation. At a later time, a zombie file manager would re-attempt the file deletion operation for those files on the fixed-length zombie file list.

While this earlier method achieved the general result of performing file deletions on very large files, it has the drawbacks that it is a source of unreliability in the file system. First, the number of files that could be processed simultaneously as zombie files was fixed in the previous version.

Second, the file deletion manager and crash recovery mechanism did not communicate. The file deletion manager did not notify the crash recovery mechanism that a file was being turned into a zombie and the crash recovery mechanism was unable to create zombie files. Thus, to allow a checkpoint to be recorded, a long file would have to be turned into a zombie. If the system crashed at this point, the crash recovery mechanism might not be able to correctly recover the file system since it is unaware that a zombie file should be created and was incapable of creating zombie files should the need arise. Similarly, the operations of the file deletion manager when creating zombie files, and its operations in deleting those zombie files, were not recorded in non-volatile storage, and thus could not be "replayed" after recovery to duplicate the operations of the file deletion manager.

Third, since the file deletion manager and replay mechanism did not communicate, the free space reported could be inaccurately reported. Attempts to restore state could fail, because the amount of free space could be different than that actually available. Attempts to restore state could also fail because the operations of the file deletion manager in using zombie files were not recorded in non-volatile storage; as a result, it might occur that other operations performed during replay could conflict with the file deletion manager and cause a crash.

Fourth, the earlier method is non-deterministic in the sense that it is not assured whether any particular file deletion operation will be completed before or after a selected consistency point. Moreover, the earlier method does not resolve problems associated with other extra-long file operations, such as requests to truncate very large files to much smaller length.

Accordingly, it would be advantageous to provide a technique for extra-long operations in a reliable state-full system (such as a file system) that is not subject to the drawbacks of the known art. Preferably, in such a technique, those parts of the system responsible for recording of consistency points are fully aware of the intermediate states of extra-long operations, the performance of extra-long operations is relatively deterministic, and performance of extra-long operations is atomic with regard to consistency points.

SUMMARY OF THE INVENTION

The invention provides a method and system for reliably performing extra-long operations in a reliable state-full system (such as a file system). The system records consistency points, or otherwise assures reliability (such as using a persistent-memory log file), notwithstanding the continuous performance of extra-long operations and the existence of intermediate states for those extra-long operations. The system provides for replay, after recovery, of those portions of extra-long operations which were completed, thus assuring that recovery and replay are consistent with operations of the file deletion manager and the zombie deletion manager. Moreover, performance of extra-long operations is both deterministic and atomic with regard to consistency points (or other reliability techniques used by the system).

The file system includes a separate portion reserved for files having extra-long operations in progress, including file deletion and file truncation. This separate portion of the file system is called the zombie filespace. The zombie filespace includes a separate name space from the regular ("live") file system and is maintained as part of the file system when recording a consistency point, just like the live filespace. The live filespace refers to those files that are accessible to users in normal operation, such as for example those files for which a path can be traced from a root of a hierarchical namespace. The file system includes a file deletion manager that determines, before beginning any file deletion operation, whether it is necessary to first move the file being deleted to the zombie filespace. The file system. includes a zombie file deletion manager that performs portions of the file deletion operation on zombie files in atomic units.

The file system also includes a file truncation manager. Before beginning any file truncation operation, the file truncation manager determines whether it is necessary to create a complementary file called an "evil twin" file, located in the zombie filespace. The truncation manager will move all blocks to be truncated from the file being truncated to the evil twin file. Moving blocks is typically faster and less resource-intensive than deleting blocks. The "evil twin" is subsequently transformed into a zombie file. The file system includes a zombie file truncation manager that can then perform truncation of the zombie file a synchronously in atomic units. Furthermore, the number of files that can be linked to the zombie filespace is dynamic, allowing the zombie filespace the ability to grow and shrink as required to process varying numbers of files.

An additional advantage provided by the file system is that files having attached data elements, called "composite" files, can be subject to file deletion and other extra-long operations in a natural and reliable manner. When performing such operations for composite files, the file system moves the entire composite file to the zombie filespace, deletes each attached data element individually, and thus resolves the composite file into a non-composite file. If the non-composite file is sufficiently small, the file deletion manager can delete the non-composite file without further need for the zombie filespace. However, if the non-composite file is sufficiently large, the file deletion manager can delete the non-composite file using the zombie filespace.

The invention provides an enabling technology for a wide variety of applications for reliable systems, so as to obtain substantial advantages and capabilities that are novel and non-obvious in view of the known art. Examples described below primarily relate to reliable file systems, but the invention is broadly applicable to many different types of systems in which reliability and extra-long operations are both present.

LEXICOGRAPHY

Figure 1:
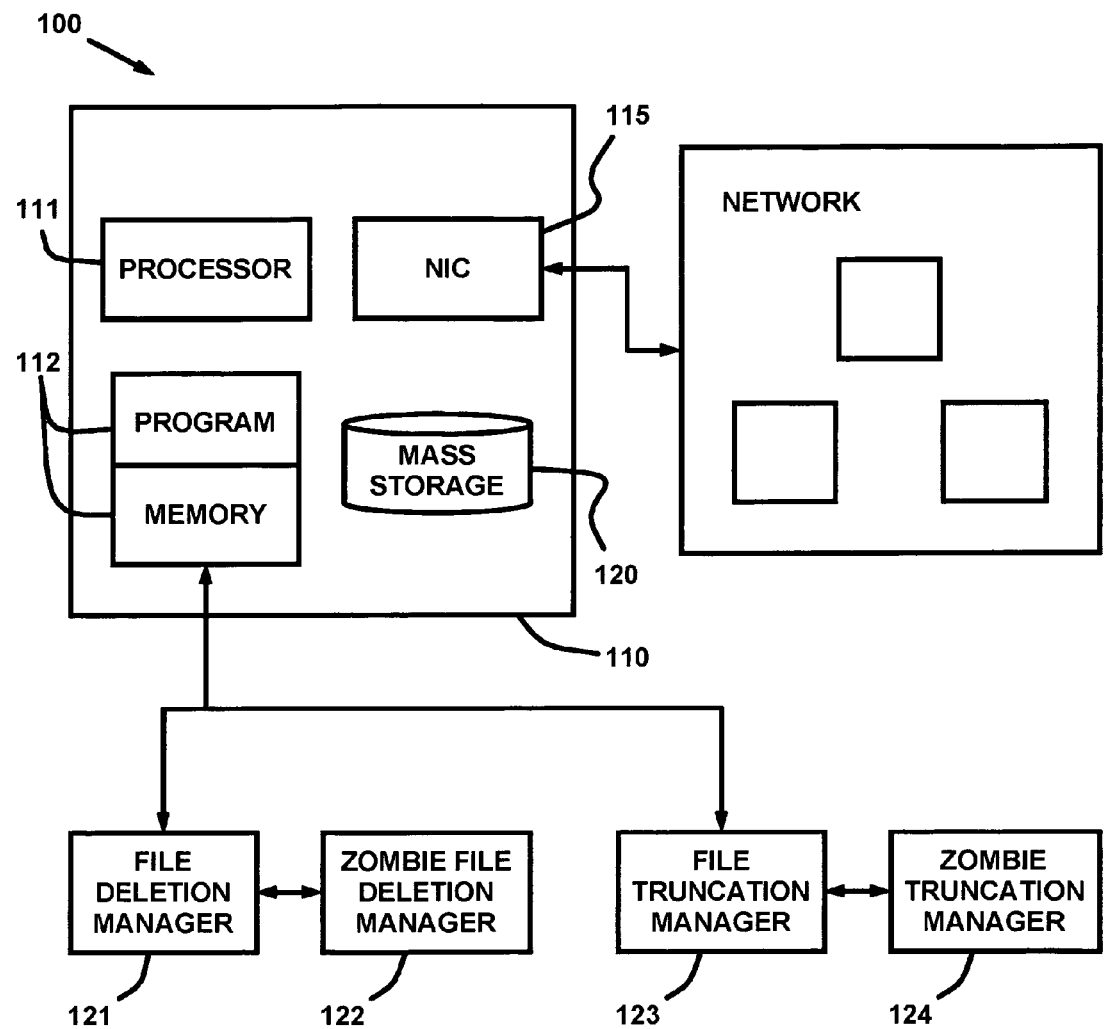
FIG. 1 shows a block diagram of a portion of a system using a zombie filespace.

The following terms refer to or relate to aspects of the invention as described below. The descriptions of general meanings of these terms are not intended to be limiting, only illustrative.

live filespace—This term generally refers to a portion of the file system where files are available to users in normal operation. In a preferred embodiment, the live filespace includes those modes (or other types of file control structure) that are not yet allocated to in-use files.

zombie filespace—This term generally refers to a portion of the file system where files are not available to users in normal operation, but can still be manipulated by the file system as if they were normal files.

Storage Operating System—in general refers to the computer-executable code operable on a storage system that implements file system semantics and manages data access. In this sense, ONTAP software is an example of such a storage operating system implemented as a microkernel, with its WAFL layer implementing the file system semantics. The storage operating system can also be implemented as an application program operating over a general-purpose operating system, such as UNIX® or Windows NT®, or as a general-purpose operating system with configurable functionality, which is configured for storage applications.

As noted above, these descriptions of general meanings of these terms are not intended to be limiting, only illustrative. Other and further applications of the invention, including extensions of these terms and concepts, would be clear to those of ordinary skill in the art after perusing this application. These other and further applications are part of the scope and spirit of the invention, and would be clear to those of ordinary skill in the art, without further invention or undue experimentation.

DETAILED DESCRIPTION OF THE PREFERRED EMBODIMENT

In the following description, a preferred embodiment of the invention is described with regard to preferred process steps and data structures. Embodiments of the invention can be implemented using general-purpose processors or special purpose processors operating under program control, or other circuits, adapted to particular process steps and data structures described herein. Implementation of the process steps and data structures described herein would not require undue experimentation or further invention.

RELATED APPLICATIONS

Inventions described herein can be used in conjunction with inventions described in the following documents.

U.S. patent application Ser. No. 09/642,062, Express Mail Mailing No. EL524780242US, filed Aug. 18, 2000, in the name of Rajesh Sundaram, et al., titled "Dynamic Data Space," now U.S. Pat. No. 6,728,922.

U.S. patent application Ser. No. 09/642,061, Express Mail Mailing No. EL524780239US, filed Aug. 18, 2000, in the name of Blake Lewis et al., titled "Instant Snapshot," now U.S. Pat. No. 7,072,916.

U.S. patent application Ser. No. 09/642,065, Express Mail Mailing No. EL524781092US, filed Aug. 18, 2000, in the name of Douglas Doucette, et al., titled "Improved Space Allocation in a Write Anywhere File System," now U.S. Pat. No. 6,636,879. and U.S. patent application Ser. No. 09/642,064, Express Mail Mailing No. EL524781075US, filed Aug. 18, 2000, in the name of Scott SCHOENTHAL, et al titled "persistent and reliable Delivery of Event Messages," now U.S. Pat. No. 6,910,154.

Each of these documents is hereby incorporated by reference as if fully set forth herein. This application claims priority of each of these documents. These documents are collectively referred to as the "Incorporated Disclosures."

System Elements

FIG. 1 shows a block diagram of a portion of a system using a zombie filespace.

A system 100 includes a file server 110 including a processor 111, program and data memory 112, a network interface card 115, and mass storage 120.

The program and data memory 112 include program instructions and data structures used by a file deletion manager 121, a zombie file deletion manager 122, a file truncation manager 123, or a zombie file truncation manager 124.

The file deletion manager 121 responds to a file server request (such as one received from a user of the file server 110), and performs an operation for deleting a file. As shown herein, the operation for deleting a file might include transferring the file from a live filespace 210 (shown in FIG. 2) to a zombie filespace 250 (shown in FIG. 2) and performing additional operations on the file in the zombie filespace 250. The zombie file deletion manager 122 performs these additional operations.

Similarly, the file truncation manager 123 responds to a file server request (such as one received from a user of the file server 110), and performs an operation for deleting a file. As shown herein, the operation for deleting a file might include transferring the file to a zombie filespace 250 and performing additional operations on the file in the zombie filespace 250. The zombie file truncation manager 124 performs these additional operations.

The network interface card 115 couples the file server 110 to a network. In a preferred embodiment, the network includes an Internet, intranet, extranet, virtual private network, enterprise network, or another form of communication network.

The mass storage 120 can include any device for storing relatively large amounts of information, such as magnetic disks or tapes, optical drives, or other types of mass storage.

File Structure Example

Figure 2:
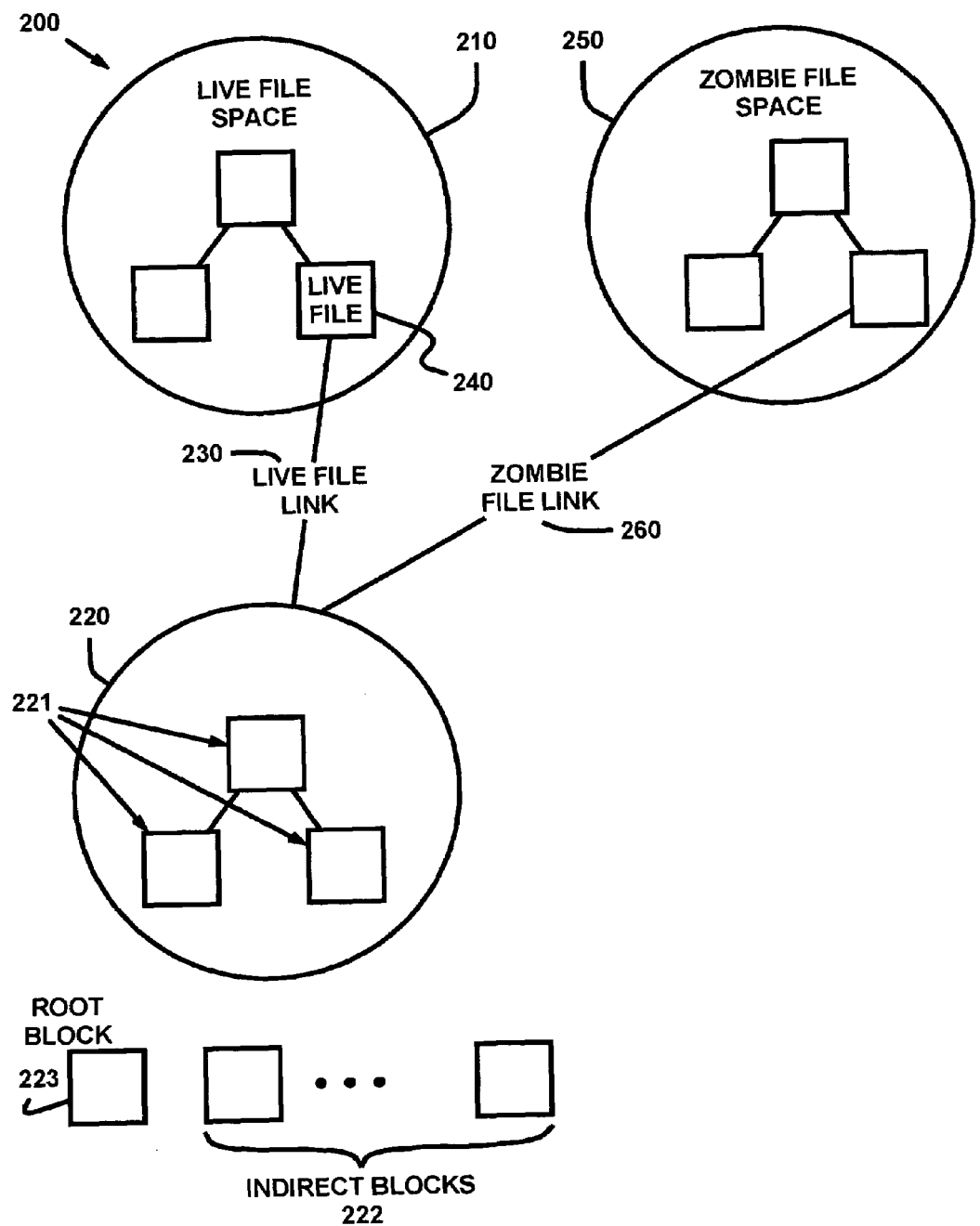
FIG. 2 illustrates a file structure in a system using a zombie filespace.

FIG. 2 illustrates a file structure in a system using a zombie filespace.

A file structure 200 includes, a live filespace 210, an inode file 220, a live file link 230, a file 240, a zombie filespace 250, and a zombie file link 260.

The live filespace 210 contains a live root block 211 and all associated blocks of data and metadata for live files. As noted above, "live files" are files in the live filespace, which may be accessed by users in normal operation.

The inode file 220 is associated with the file to be deleted and contains information about the file. The inode file 220 itself is preferably recorded using a tree structure, in which individual entries 221 for files (including their live file links 230) are maintained at leaves of the tree, and in which one or more indirect blocks 222 are maintained at nodes of the tree to allow the entire inode file 220 to be reached from a root block 223 therefor. Small inode files 220 might not require any indirect blocks 222, or might even be stored directly in data blocks for their containing directory.

The live file link 230, links a file to the live filespace 210.

Similar to an inode file 220, the file 240 includes a plurality of file blocks 241, and a plurality of block links 242. The file blocks 241 are connected by the plurality of block links 242. The file 240 is illustrative of a file to be deleted. The structure of the file as defined above is a hierarchical tree-like structure, however, there is no requirement in any embodiment of the invention that the invention be applied only to file structures (or inode structures) of this type. The use of a hierarchical tree-like structure filing system is intended to be illustrative only and not limiting.

If the file is a composite file, it has attached data elements 243 which are associated with the file 240 (such as possibly by one or more references from the file's inode file 220).

The zombie filespace 250 contains a zombie root block 251 and all associated blocks of data for zombie files (files in the zombie filespace, which are in the process of being deleted or truncated).

The zombie file link 260 links a file to be deleted to the zombie filespace 250. A file that has been linked to the zombie filespace 250 is referred to as a "zombie file" while it is so linked. Zombie files in the zombie filespace 250 are maintained in like manner as live files 240 in the live filespace 210.

Method of Operation—File Deletion

Figure 3:
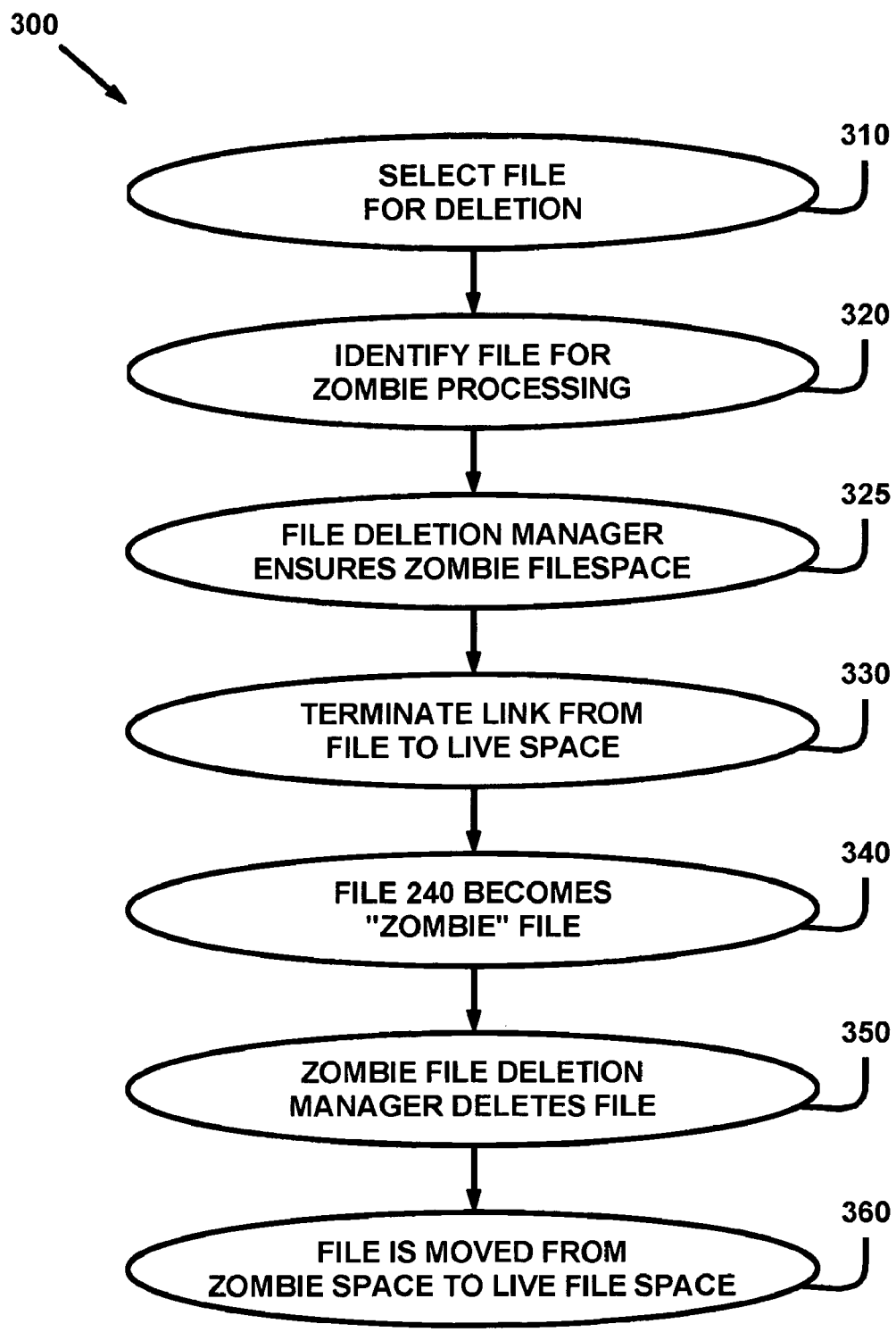
FIG. 3 shows a process flow diagram for file deletion in a method for operating a system for manipulation of zombie files and Evil-twin files.

FIG. 3 shows a process flow diagram for file deletion in a method for operating a system for manipulation of zombie files and Evil-twin files.

A method 300 includes a set of flow points and a set of steps. The system 100 performs the method 300. Although the method 300 is described serially, the steps of the method 300 can be performed by separate elements in conjunction or in parallel, whether a synchronously, in a pipelined manner, or otherwise. There is no particular requirement that the method 300 be performed in the same order in which this description lists the steps, except where so indicated.

In this method 300, each operation denoted by a flow point is recorded in a file system log, such as a persistent memory that can be accessed in the event of a file system crash or other service interruption. The file system can and does generate checkpoints while these operations are being performed. After a crash, the file system replays the operations noted in the log, as further described with regard to FIG. 5.

At a flow point 310, a system user selects the file 240 for deletion. User interfaces for this activity vary from system to system but are well known in the art.

At a flow point 320, the file 240 is identified by the system as a large file requiring zombie processing. In a preferred embodiment, the specific size of a file necessary to trigger zombie processing is parameter-based, software-selectable, however, it can be any set of instructions supporting this functionality, such as instructions hard-coded on a computer chip.

The file 220 is identified as a large file in response to an amount of time calculated as necessary to delete the file 220. The amount of time is calculated in response to a number of data blocks included in the file, and in response to a size on record for the file. In a preferred embodiment, the file 220 is identified as a large file if it has more than one indirect block 241, that is, if the file 220 has more than about 1,024 data blocks 241. In a preferred embodiment, all composite files 220 are also identified as large files for this purpose.

In alternative embodiments, depending on the underlying implementation of the file system and storage operating system, the file is identified as a large file in response to other metrics of when extra-long operations can consume too many resources at once, hold resources locked for too long a period of time, or otherwise consume too much of a single resource, or some combination thereof, so as to jeopardize correct operation of other parts of the file system and storage operating system. Examples of such other metrics include an amount of log space, a number of log entries, or some other measure of unfinished work needed to be completed, that would be used if the deletion (or truncation) operation is too large.

At a flow point 325, the file deletion manager 121 determines whether the zombie filespace 250 needs to be enlarged to accommodate another zombie file, and if necessary enlarges the zombie filespace.

In a preferred embodiment, the file deletion manager 121 attempts to allocate an entry in the zombie filespace 250. If this is possible (that is, at least one entry is available in the zombie filespace 250 for use), the file deletion manager 121 can proceed without requesting enlargement of the zombie filespace 250. If there is no entry available in the zombie filespace 250 for use, the file deletion manager 121 requests the file server 110 to enlarge the zombie filespace 250 (such as by creating another free entry therein), and proceeds to allocate the newly created free entry for use. If the newly created free entry has been allocated by another process, the file deletion manager 121 repeats this flow point until it is able to allocate an entry for its own use.

At a flow point 330, the link connecting the file 240 to the live filespace 210 is terminated. At this point the file 240 is no longer available to users connected to the file server 110.

In a preferred embodiment, the file deletion manager 121 also alters the generation number of the inode 220 for the file 210, so that external users of the file server 110 can no longer refer to the file 210 by file handles they might have kept. Those users will see the file 210 as having disappeared (that is, been deleted).

At a flow point 340, the file 240 is linked to the zombie filespace 250 via the zombie file link 260. At this point, file 240 is referred to as a zombie file.

At a flow point 350, the zombie file deletion manager 122 starts deleting portions of the file 240 by terminating block links 242 at the outer leaves of the file tree. As file blocks 241 are deleted by the zombie deletion manager 122, they become available for storage of other data. This fact is reflected in the free space indicator of the mass storage 120.

At a flow point 360, the file 240 is deleted. Since the file 240 in the zombie filespace 250 has been deleted, this is equivalent to freeing the inode 220, and any other file system control structure, for the file 240, and terminating any link between the file 240 and the zombie filespace 250.

Method of Operation—File Truncation

Figure 4:
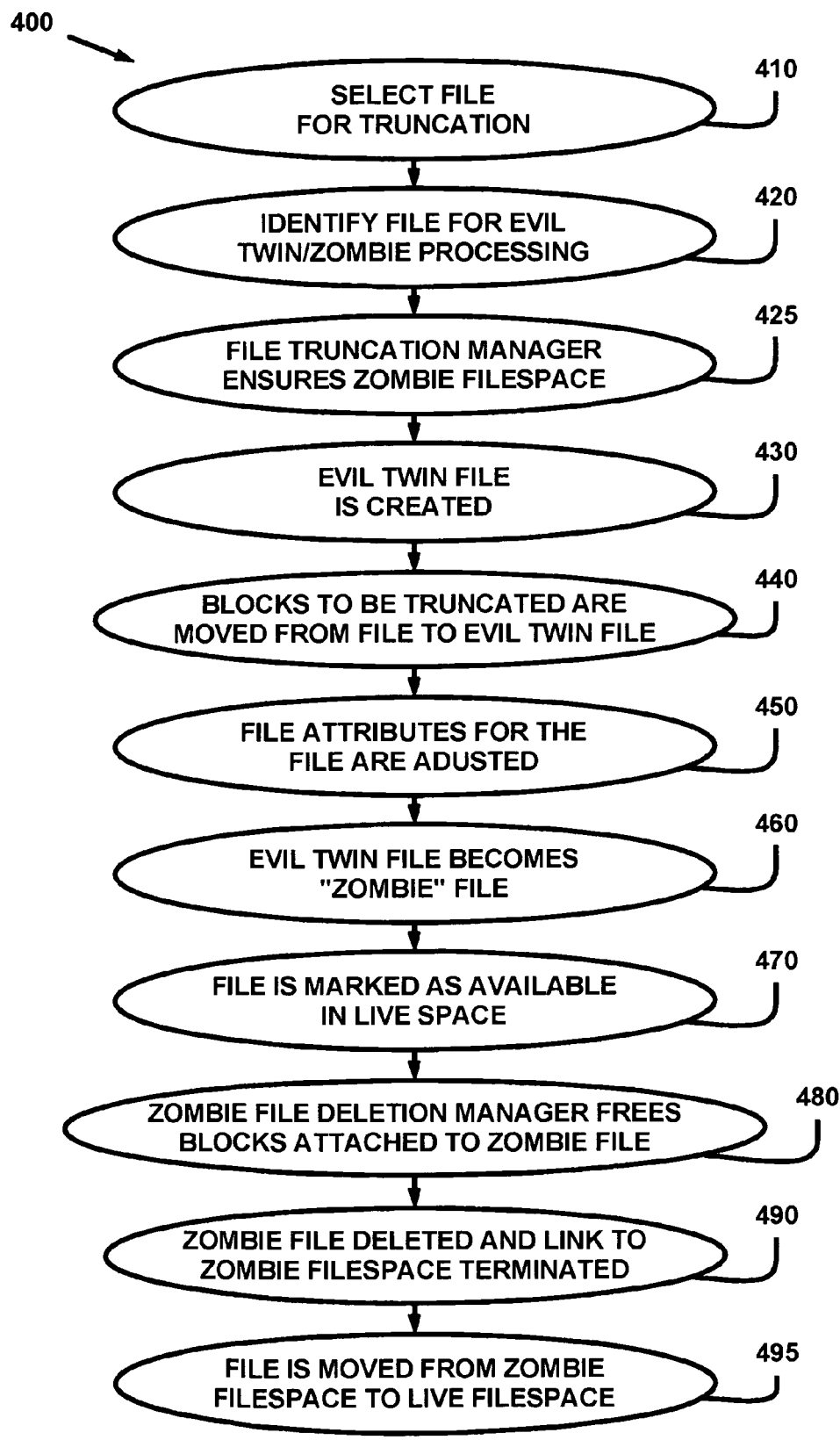
FIG. 4 shows a process flow diagram for file truncation in a method for operating a system Manipulation of Zombie Files and Evil-Twin Files.

FIG. 4 shows a process flow diagram for file truncation in a method for operating a system Manipulation of Zombie Files and Evil-Twin Files.

A method 400 includes a set of flow points and a set of steps. The system 100 performs the method 400. Although the method 400 is described serially, the steps of the method 400 can be performed by separate elements in conjunction or in parallel, whether a synchronously, in a pipelined manner, or otherwise. There is no particular requirement that the method 400 be performed in the same order in which this description lists the steps, except where so indicated.

In this method 400, each operation denoted by a flow point is recorded in a file system log, such as a persistent memory that can be accessed in the event of a file system crash or other service interruption. The file system can and does generate checkpoints while these operations are being performed. After a crash, the file system replays the operations noted in the log, as further described with regard to FIG. 5.

At a flow point 410, a system user selects the file 240 for truncation. User interfaces for this activity vary from system to system but are well known in the art.

At a flow point 420, the file system (that is, the file system component of the storage operating system) identifies the amount of the file to be truncated as requiring evil twin/zombie processing. In the preferred embodiment, the specific amount of data to be truncated necessary to trigger evil twin/zombie processing is parameter-based software-selectable; however, it can be any set of instructions supporting this functionality, such as instructions hard-coded on a computer chip. In a preferred embodiment, identification of a file for evil twin processing is similar to identification of a file for zombie processing.

At a flow point 425, the file truncation manager 123 determines whether the zombie filespace 250 needs to be enlarged to accommodate another zombie file, and if necessary enlarges the zombie filespace. This flow point is similar to the flow point 325.

At a flow point 430, an evil twin file is created. At this point the file 240 is unavailable to the user. This flow point is similar to the flow points 330 and 340, except that the original file is not removed from the live filespace 210.

At a flow point 440, blocks of data to be truncated are moved from the file 240 to the evil twin file. Links associating the data blocks to be truncated from the live file in the live filespace are broken, and corresponding links associating the same data blocks with the evil twin file in the zombie filespace are created. This flow point is similar to the flow points 330 and 340, except that only a subset of the data blocks in the original file are removed from the live filespace 210 and transferred to the zombie filespace 250.

At a flow point 450, file attributes for the file 240 are adjusted appropriately (for example, the size of the file, the number of blocks in the file, and the file's timestamp).

At a flow point 460, the evil twin file is turned into a zombie file. It is connected to the zombie filespace. This flow point is similar to the flow point 340, except that it is the evil twin, not the original file, which is linked to the zombie filespace 250.

At a flow point 470, the file 240 is marked as available in the live filespace. At this point the file 240 is available to all users.

At a flow point 480, the zombie file deletion manager 122 frees all blocks attached to the zombie file.

At a flow point 490, the zombie file has been deleted and the link to the zombie filespace 250 is terminated. Since the zombie file in the zombie filespace 250 has been deleted, this is equivalent to freeing the inode 220, and any other file system control structure, for the zombie file.

Method of Operation—Replay

Figure 5:
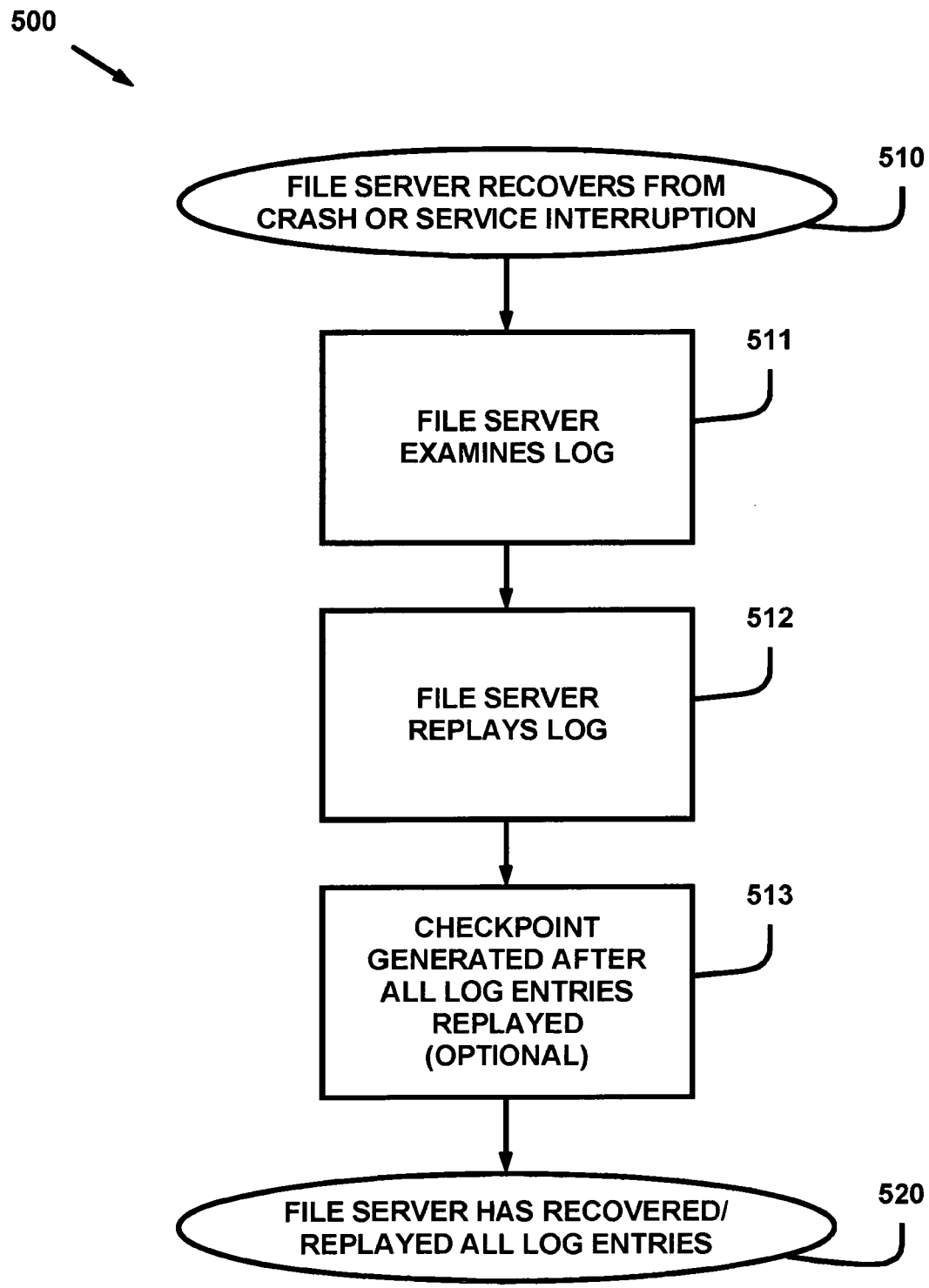
FIG. 5 shows a process flow diagram for replaying operations in a method for operating a system Manipulation of Zombie Files and Evil-Twin Files.

FIG. 5 shows a process flow diagram for replaying operations in a method for operating a system Manipulation of Zombie Files and Evil-Twin Files.

A method 500 includes a set of flow points and a set of steps. The system 100 performs the method 500. Although the method 500 is described serially, the steps of the method 500 can be performed by separate elements in conjunction or in parallel, whether a synchronously, in a pipelined manner, or otherwise. There is no particular requirement that the method 500 be performed in the same order in which this description lists the steps, except where so indicated.

At a flow point 510, the file server 110 has recovered from a crash or other service interruption.

At a step 511, the file server 110 examines its log (preferably recorded in a persistent memory), and determines which log entries should be replayed. In a preferred embodiment, those log entries not marked in the log as being committed as part of a consistency point are required to be replayed. In a preferred embodiment, the log is recorded in a persistent memory and pointed to by at least one link from a persistently recorded file system control block. To quickly determine this, the file system control block is preferably flagged as being "clean" when the system is shut down normally. When rebooting, the system can check each file system to determine if was shut down cleanly. If it was not, then log entries that reflect changes not present in the on-disk file system must be replayed. There are known techniques for determining which such log entries. One method is time-stamping when log entries and the file system control block were last updated.

At a step 512, the file server 110 replays the operation designated by each log entry, thus re-performing those operations.

At an optional (but preferred) step 513, the file server 110 generates a checkpoint when all log entries have been replayed.

At a flow point 520, the file server 110 has both recovered from the crash or other service interruption, and replayed all necessary log entries, so normal file server operations can proceed.

Generality of the Invention

The invention has general applicability to various fields of use, not necessarily related to the services described above. For example, these fields of use can include one or more of, or some combination of, the following:

The invention is applicable to all computer systems utilizing large files.

The invention is applicable to all computer systems performing long-duration operations on files.

Other and further applications of the invention in its most general form, will be clear to those skilled in the art after perusal of this application, and are within the scope and spirit of the invention.

Although preferred embodiments are disclosed herein, many variations are possible which remain within the concept, scope, and spirit of the invention, and these variations would become clear to those skilled in the art after perusal of this application.

The invention claimed is:

1. A method comprising:
maintaining in a computer system a file system that includes a live filespace accessible to users and a zombie filespace not accessible to users;
in response to a request to delete at least a portion of a file stored in the live filespace, moving blocks storing said portion of the file from the live filespace to the zombie filespace and deleting at least some of the blocks from the zombie filespace before a scheduled consistency checkpoint of the file system;
recording said moving and deleting in a persistent memory; and
in response to a service interruption in the computer system, recovering the file system in the computer system by replaying said moving and deleting based on information stored in the persistent memory.

2. The method of claim 1, wherein the zombie filespace is a portion of the file system where files are not available to users in normal operation, but can still be manipulated by the file system as if the files were normal files.

3. The method of claim 1 further comprising deleting rest of the blocks from the zombie filespace after the scheduled consistency checkpoint of the file system and recording deleting the rest of the blocks in the persistent memory.

4. The method of claim 1, wherein moving blocks storing said portion of the file from the live filespace to the zombie filespace comprises breaking links associating these blocks with the live filespace and creating links associating these blocks with the zombie filespace.

5. The method of claim 1, wherein moving blocks storing said portion of the file from the live filespace to the zombie filespace comprises creating an evil twin file in the zombie filespace and adding these blocks as part of the evil twin file.

6. The method of claim 1, wherein recording said moving and deleting in a persistent memory comprises recording changes of the live filespace and the zombie file space caused by said moving and deleting in the persistent memory.

7. The method of claim 6, wherein replaying said moving and deleting based on information stored in the persistent memory comprises replaying the changes of the live filespace and the zombie file space recorded in the persistent memory.

8. The method of claim 1, wherein the request to delete at least a portion of a file stored in the live filespace comprises a request to delete the file from the live filespace or to truncate the file.

9. The method of claim 1, wherein deleting a block from the zombie filespace comprises returning the block as a free block to the file system.

10. The method of claim 1 further comprising increasing the size of the zombie filespace before moving the blocks.

11. The method of claim 1, wherein the request to delete at least a portion of the file consumes extra long period of time.

12. A method comprising:
maintaining in a computer system a file system that includes a live filespace accessible to users and a zombie filespace not accessible to users;
in response to a request to delete a file having attached data elements from the live filespace, moving blocks storing the file and the attached data elements from the live filespace to the zombie filespace, and deleting at least some of the blocks from the zombie filespace before a scheduled consistency checkpoint of the file system;

recording said moving and deleting in a persistent memory; and in response to a service interruption in the computer system, recovering the file system in the computer system by replaying said moving and deleting based on information stored in the persistent memory.

13. The method of claim 12, wherein the zombie filespace is a portion of the file system where files are not available to users in normal operation, but can still be manipulated by the file system as if the files were normal files.

14. The method of claim 12 further comprising deleting rest of the blocks from the zombie filespace after the scheduled consistency checkpoint of the file system and recording deleting the rest of the blocks in the persistent memory.

15. A machine-readable medium having instructions, which when executed by a processor in a machine, cause the machine to perform a method, the method comprising:

maintaining in a computer system a file system that includes a live filespace accessible to users and a zombie filespace not accessible to users;

in response to a request to delete a file from the live filespace, moving blocks storing the file from the live filespace to the zombie filespace and deleting at least some of the blocks from the zombie filespace before a scheduled consistency checkpoint of the file system;

recording said moving and deleting in a persistent memory; and in response to a service interruption in the computer system, recovering the file system in the computer system by replaying said moving and deleting based on information stored in the persistent memory.

16. The machine-readable medium of claim 15, wherein the method further comprises deleting rest of the blocks from the zombie filespace after the scheduled consistency checkpoint of the file system and recording deleting the rest of the blocks in the persistent memory.

17. The machine-readable medium of claim 15, wherein moving blocks storing the file from the live filespace to the zombie filespace comprises breaking links associating these blocks with the live filespace and creating links associating these blocks with the zombie filespace.

18. The machine-readable medium of claim 15, wherein recording said moving and deleting in a persistent memory comprises recording changes of the live filespace and the zombie file space caused by said moving and deleting in the persistent memory.

19. The machine-readable medium of claim 15, wherein replaying said moving and deleting based on information stored in the persistent memory comprises replaying the changes of the live filespace and the zombie file space recorded in the persistent memory.

20. A machine-readable medium having instructions, which when executed by a processor in a machine, cause the machine to perform a method, the method comprising:

maintaining in a computer system a file system that includes a live filespace accessible to users and a zombie filespace not accessible to users;

in response to a request to truncate a file stored in the live filespace, moving blocks storing a portion of the file to be truncated from the live filespace to the zombie filespace and deleting at least some of the blocks from the zombie filespace before a scheduled consistency checkpoint of the file system;

recording changes of the live filespace and the zombie filespace caused by said moving and deleting in a persistent memory; and in response to a service interruption in the computer system, recovering the file system in the computer system by replaying said moving and deleting based on information stored in the persistent memory.

21. The machine-readable medium of claim 20, wherein moving blocks storing a portion of the file to be truncated from the live filespace to the zombie filespace comprises creating an evil twin file in the zombie filespace and adding these blocks as part of the evil twin file.

22. The machine-readable medium of claim 20, wherein the method further comprises deleting rest of the blocks from the zombie filespace after the scheduled consistency checkpoint of the file system and recording changes of the zombie filespace caused by deleting the rest of the blocks in the persistent memory.

23. The machine-readable medium of claim 20, wherein the method further comprises increasing the size of the zombie filespace before moving the blocks.

24. The machine-readable medium of claim 20, wherein the request to truncate the file consumes extra long period of time.

25. A storage server comprising:

a processor;

a network interface through which to communicate with a client;

a storage interface through which to access a plurality of mass storage devices on behalf of the client; and a memory coupled to the processor, the memory storing instructions which, when executed by the processor, cause the storage server to perform a process comprising:

maintaining in a computer system a file system that includes a live filespace accessible to the client and a zombie filespace not accessible to the client;

in response to a request to delete at least a portion of a file stored in the live filespace, moving blocks storing said portion of the file from the live filespace to the zombie filespace and deleting at least some of the blocks from the zombie filespace before a scheduled consistency checkpoint of the file system;

recording said moving and deleting in a persistent memory; and in response to a service interruption in the computer system, recovering the file system in the computer system by replaying said moving and deleting based on information stored in the persistent memory.

26. The storage server of claim 25, wherein the process further comprises deleting rest of the blocks from the zombie filespace after the scheduled consistency checkpoint of the file system and recording deleting the rest of the blocks in the persistent memory.

27. The storage server of claim 25, wherein moving blocks storing said portion of the file from the live filespace to the zombie filespace comprises breaking links associating these blocks with the live filespace and creating links associating these blocks with the zombie filespace.

28. The storage server of claim 25, wherein recording said moving and deleting in a persistent memory comprises recording changes of the live filespace and the zombie file space caused by said moving and deleting in the persistent memory.

29. The storage server of claim 28, wherein replaying said moving and deleting based on information stored in the persistent memory comprises replaying the changes of the live filespace and the zombie file space recorded in the persistent memory.

30. The storage server of claim 25, wherein the request to delete at least a portion of a file stored in the live filespace comprises a request to delete the file from the live filespace or to truncate the file.

31. The storage server of claim 25, wherein deleting a block from the zombie filespace comprises returning the block as a free block to the file system.

32. The storage server of claim 25, wherein the process further comprises increasing the size of the zombie filespace before moving the blocks.

* * * * *